Oct. 19, 1937.   A. LYSHOLM   2,095,991
GAS TURBINE SYSTEM OF THE CONTINUOUS COMBUSTION TYPE
Filed Oct. 19, 1934   5 Sheets-Sheet 1

INVENTOR
Alf Lysholm
BY
ATTORNEY

Oct. 19, 1937. A. LYSHOLM 2,095,991
GAS TURBINE SYSTEM OF THE CONTINUOUS COMBUSTION TYPE
Filed Oct. 19, 1934 5 Sheets-Sheet 2

Oct. 19, 1937.   A. LYSHOLM   2,095,991
GAS TURBINE SYSTEM OF THE CONTINUOUS COMBUSTION TYPE
Filed Oct. 19, 1934   5 Sheets-Sheet 4

INVENTOR
Alf Lysholm
BY
ATTORNEY

Oct. 19, 1937.     A. LYSHOLM     2,095,991
GAS TURBINE SYSTEM OF THE CONTINUOUS COMBUSTION TYPE
Filed Oct. 19, 1934     5 Sheets-Sheet 5

Patented Oct. 19, 1937

2,095,991

UNITED STATES PATENT OFFICE 2,095,991

GAS TURBINE SYSTEM OF THE CONTINUOUS COMBUSTION TYPE

Alf Lysholm, Stockholm, Sweden, assignor to Aktiebolaget Milo, Stockholm, Sweden, a corporation of Sweden Application October 19, 1934, Serial No. 749,006
In Great Britain March 8, 1933

14 Claims. (Cl. 60—41)

This application is a continuing application replacing my copending application Serial No. 714,228 filed March 6, 1934, and relates back as to all common subject matter to said application Serial No. 714,228 for all dates and rights incident to the filing of said application and foreign applications corresponding thereto.

The present invention relates to gas turbine systems of the continuous combustion type as distinguished from such systems of the intermittent combustion or explosion type. The type of system with which this invention is concerned is sometimes referred to as a constant pressure system, since the pressure of the motive fluid for any given load on the system remains at substantially constant value, the value of the pressure changing, however, for different values of load on the system.

In systems of the continuous combustion type, control of the total power developed by the system has been effected by varying the supply of fuel in order to compensate for changes in the load on the system. This control is desirable because of its simplicity, but where the load on the system changes to a substantial degree so that the system at times may be called upon to operate at a partial load that is substantially less than normal full load, control of the system by variation of the amount of fuel supplied alone is not entirely satisfactory for reasons to be hereinafter pointed out.

One of the characteristics of operation of continuous combustion systems wherein control is effected by variation of the amount of fuel supplied in response to change in load, is that the inlet temperature of the motive fluid remains comparatively constant over a wide load range, but as the load drops, a further characteristic of such a system when controlled in this manner is that at low load and with correspondingly low compressor power output, the exhaust temperature from one or more of the turbines, particularly that of any low pressure turbine of the system exhausting to atmosphere or other constant pressure receiver, will rise to a value exceeding the maximum permissible value.

This is particularly true in the case of turbines in which the path of expansion has a substantial component of flow in radial outward direction from inlet to exhaust. The reason for this is that in such turbines the mean diameters of the blade rows adjacent to the exhaust end of the turbine are substantially greater than the mean diameters of the blade rows adjacent to the inlet end of the turbine, and the blading in the former rows is subjected to much higher centrifugal forces than the blading in the latter rows. Consequently, other things being equal, the higher mechanical stresses imposed upon the exhaust blading than upon the inlet blading, preclude safe operation of the exhaust blading at temperatures as high as or even closely approaching the safe temperature of operation for the inlet blading. From this it will be evident that substantial rises above normal of the exhaust gas temperature may result in an operating temperature exceeding the maximum permissible value for the exhaust blading of the turbine.

Furthermore, in systems of the above described character in which two or more turbines are connected in series with respect to flow of motive fluid, the relative amounts of heat drop in the turbines may so change as the load on the system decreases, that the turbine or turbines providing the last stage of expansion for the motive fluid cannot produce the amount of power required of them at the reduced load. The reason for the tendency of the exhaust temperature of a low pressure turbine in such a system to rise as the load decreases is that the inlet pressure of the motive fluid decreases with decrease in the value of the load, whereas the exhaust pressure remains constant. Consequently, at reduced load, the pressure drop through the low pressure turbine is less than that at normal or full load. With reduced pressure drop through the turbine, the heat drop through the turbine is reduced. The total heat energy in the motive fluid as admitted to the turbine does not decrease in proportion to the decrease in pressure. Consequently, with the total heat input to the turbine decreasing less rapidly than the heat drop through the turbine, the exhaust temperature rises. With two turbines connected in series, the heat drop through the high pressure turbine does not decrease as rapidly with a given decrease in load as does the heat drop through the low pressure turbine. This is because the high pressure turbine receives motive fluid at reduced pressure when the load decreases, and exhausts motive fluid at a lower back pressure. The low pressure turbine, however, as explained above, exhausts against a substantially constant back pressure and, receiving motive fluid at a lower inlet pressure, can expand it only through a pressure range that decreases more rapidly than the pressure range through the high pressure turbine. This characteristic of operation results in a change in the relative outputs of the two turbines, the power output from the low pressure turbine dropping more rapidly than the power output from the high pressure turbine. Consequently, when the load on the system decreases to a material extent, a condition may arise where the small heat drop through the low pressure turbine will, in addition to producing undesirably high exhaust temperature, fail to produce enough power from the low pressure turbine to enable it to perform its share of the work in the system.

It is the primary object of the present invention to eliminate the difficulties heretofore encountered in the control of a system of the character under discussion for widely varying loads when the control is effected primarily by control of the fuel supply, and to this end I have provided novel method and means for effecting the control which will be explained in detail in the ensuing description of numerous different embodiments of apparatus suitable for the carrying of the invention into effect.

Other and more detailed objects of the invention, together with the advantages to be derived from its use, will become apparent as the description proceeds.

In the accompanying drawings, forming a part of this specification.

In accordance with the present invention, control of the system, in order to take care of load variations thereon, is effected by two controls or governing means, one of which may be termed the primary governor or main governor, which controls the total power developed by the system by controlling the primary or main fuel supply, while the other governing means, which may be termed the secondary governor or auxiliary governor, controls either directly or indirectly the exhaust temperature of such of the turbines as require such control, and/or controls the distribution of the energy input to the individual turbines.

As will hereinafter appear, the auxiliary governor may be responsive to one or more or a number of different impulses indicative of the load on the system, and may effect the desired control of exhaust temperature and/or energy distribution in several different ways. It may be pointed out here that in order for the primary and secondary governors to be able to operate so as to effect the control contemplated by the invention, the system must include one or more compressor turbines which are independent with respect to speed from the turbine or turbines from which the net useful power developed by the system is obtained. In other words, the system must comprise at least one compressor turbine operating on a shaft separate and independent from the useful power turbine means.

Figure 1:
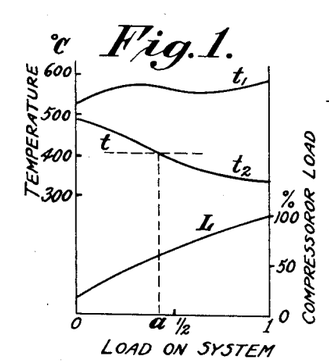
Fig. 1 is a diagram illustrating certain temperature and load values with respect to load on the system.

Referring now to Fig. 1, the diagram illustrates by means of curve $t_1$ a characteristic variation in the inlet temperature of the motive fluid over the full load range of a system of the character under discussion, and curve $t_2$ illustrates the variation in exhaust temperature over this range. Curve L illustrates the variations in the compressor load, that is, the amount of power absorbed by the compressor means over the full load range of the system.

If we assume $t$ to be the maximum permissible exhaust temperature, it is evident from Fig. 1 that when the load on the system drops to value $a$, control must be effected to prevent further rise in exhaust temperature, which control cannot be effected solely through control of the primary fuel supply. The reason for this will be explained in connection with the following description of a system of the continuous combustion type illustrated in Fig. 2 and embodying the invention.

Figure 2:
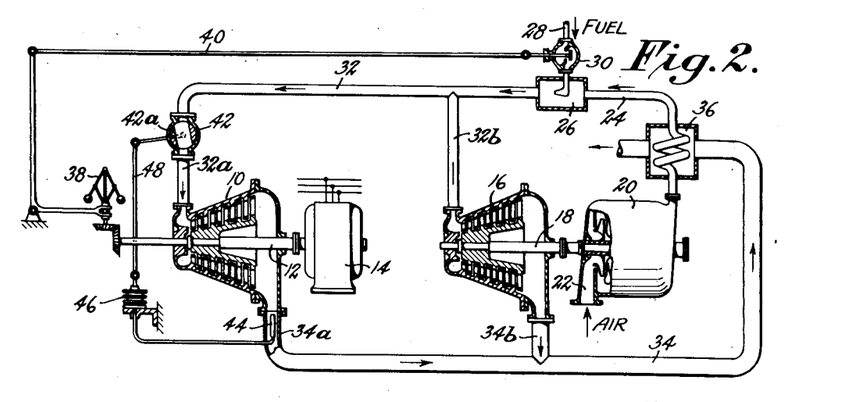
Fig. 2 is a diagrammatic view partly in section of a gas turbine system embodying the invention.

Referring now more particularly to Fig. 2, a relatively simple low pressure system of the character under discussion has been illustrated for the sake of simplicity. This system comprises a power output turbine 10 having a shaft 12 from which useful power is derived. In the embodiment illustrated, useful power is taken off in the form of electrical energy from a generator 14 driven by shaft 12. The turbine 10 illustrated is of the axial flow type. It may be of another type. The useful power taken from this turbine may be in other form than electrical energy.

A second turbine 16 having a shaft 18 independent of the turbine shaft 12 drives a compressor 20 to which air is admitted through the inlet 22. Compressed air from compressor 20 is delivered through conduit 24 to a combustion chamber 26, to which fuel, which may advantageously be in the form of liquid hydrocarbon, is supplied from pipe 28 under the control of a main control valve 30. The motive fluid produced by internal combustion of fuel with compressed air in the combustion chamber 26 is delivered through the inlet conduit 32 having branches 32a and 32b, to turbines 10 and 16, which it will be observed are connected in parallel with respect to flow of motive fluid. Turbines 10 and 16 exhaust respectively through exhaust conduits 34a and 34b to the exhaust conduit 34, which advantageously delivers the exhaust to a regenerator 36 through which the compressed air conduit 24 passes.

The primary or main governor is, in this embodiment, illustrated diagrammatically as a centrifugal governor 38 driven from the turbine shaft 12 and operating through suitable linkage indicated generally at 40 to control the fuel supply valve 30 in accordance with changes in load on the system. Obviously other known control means may be employed for effecting control of the main fuel supply valve in accordance with variations in load on the system.

The secondary or auxiliary governor in this embodiment comprises a control valve 42 located in the inlet conduit so as to control flow of motive fluid to the branch 32a leading to the power output turbine. Valve 42 may advantageously be of the rotary sleeve or plug type so as to provide little if any resistance to flow of motive fluid therethrough when the valve is open, and in the present embodiment valve 42 is controlled by temperature responsive means consisting of a thermostat 44 located in the exhaust branch conduit 34a of the useful power turbine and actuating mechanism which in the present instance has been shown by way of example as comprising a bellows 46 expansible upon rise of thermostat temperature, and linkage 48 connecting the bellows with the valve member 42a of valve 42. As illustrated in the drawing valve 42 may advantageously be of a type such that the flow of motive fluid to the branch conduit 32a is not throttled upon initial movement of the valve member 42a from the position which it occupies at full load.

Considering now the operation of the system illustrated and not taking into consideration the secondary or auxiliary governor, and further assuming the system to be running at normal full load, the operation upon reduction in the value of the load on the system is as follows: as soon as the load drops, the main governor 38 acts to reduce the flow of fuel through valve 30. This in turn reduces the energy input to the turbines by effecting a temporary reduction in the temperature of the motive fluid. The reduced temperature of the motive fluid results in a reduced heat drop and reduced power output of the turbines, which consequently tend to slow down. As a result the speed of the compressor 20 is reduced, and the quantity and pressure of the air supplied to the combustion chamber is also reduced. The reduced quantity of air supplied to the combustion chamber causes the temperature of the motive fluid delivered from the combustion chamber to rise again, and a stabilized condition of operation of the system at reduced load is arrived at, at which the motive fluid is supplied to the turbines at reduced pressure and at a temperature approximately that of full load temperature as illustrated by the curve $t_1$ of Fig. 1. Stabilized inlet temperature of the motive fluid varies somewhat with variations in load, this variation being largely due to variations in the efficiency of the compressor when operating at the different speeds corresponding to different loads on the system.

As hereinbefore explained, the exhaust temperature will rise as the load decreases, as shown by curve $t_2$ in Fig. 1, and the secondary or auxiliary governor, in the embodiment illustrated, then comes into action when the temperature rises to a predetermined value, to throttle the supply of motive fluid to the useful power turbine. This throttling of the motive fluid causes a greater proportion of the motive fluid to flow to the compressor turbine, the power output from which increases. The increased proportion of power delivered by the compressor turbine causes the compressor to operate at higher speed and to provide air at higher pressure than would be the case if the normal distribution of motive fluid to the turbines through the unrestricted conduits took place. As a result, the inlet pressure is prevented from falling below a predetermined minimum value. Consequently, there is a higher pressure drop and consequently a greater heat drop through the turbines, and in addition the greater quantity of air resulting from the higher operating rate of the compressor 20 results in a somewhat reduced temperature of the combustion gases at the turbine inlets. These factors combine to prevent the rise of exhaust temperature above a predetermined value.

As previously stated, the desired result may be obtained by a wide variety of forms of auxiliary governing means, which may be responsive to numerous different factors, and which may operate in different ways to effect the desired control.

In Figs. 2a to 2h, a number of different embodiments of auxiliary governing apparatus are shown, and in such of the figures as do not show the complete system, the remainder of the apparatus may be assumed to be like that shown in Fig. 2.

Figure 2A:
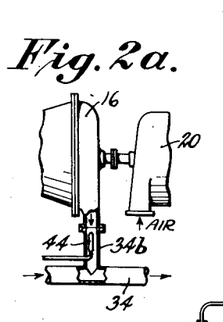
Fig. 2a illustrates a modification of Fig. 2 in which secondary control is effected in direct response to exhaust from the compressor turbine.

Fig. 2a illustrates the thermostat element of the auxiliary governing apparatus located in the outlet 34b of the compressor turbine 16. In other respects the arrangement is the same as that shown in Fig. 2. It will be evident to anyone skilled in the art that as the load on the system shown in Fig. 2 drops the exhaust temperature of both turbines will tend to rise when the system is governed by a primary governor of the character shown, and consequently the secondary control may be made responsive to the exhaust temperature from either turbine with equal facility.

Figure 2B:
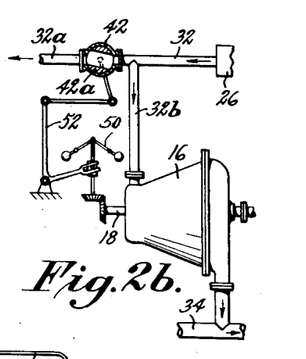
Fig. 2b is another modification of Fig. 2 in which secondary control is effected directly in response to variation in speed of the compressor turbine.

Fig. 2b illustrates an arrangement whereby the secondary control valve 42 for throttling the supply of motive fluid to the power turbine 10 upon reduction of load is made responsive to a governor 50 responsive to variations in speed of the compressor turbine shaft 18. The governor 50 actuates the auxiliary control valve 42 through suitable linkage indicated generally at 52. In other respects the system is as shown in Fig. 2, and the controlling action will be similar to that described in connection with Fig. 2. As previously explained, the compressor turbine 16 will slow down at part load under the influence of the regulation effected by the main governor, and the reduction in the speed of operation of this turbine is inherently accompanied by a rise in the exhaust temperature in a system of the character in which the apparatus is embodied. The speed of the compressor corresponding to a rise in exhaust temperature to the maximum permissible value is a determinable factor, and accordingly the speed of the compressor turbine may provide an impulse indicative of the load on the system and of the exhaust temperature conditions which may be employed for regulation instead of the temperature impulse provided by the thermostats located in the outlet as illustrated in Figs. 2 and 2a.

Figure 2C:
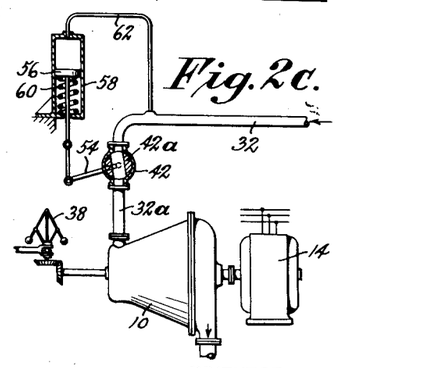
Fig. 2c is a further modification of Fig. 2 in which secondary control is made directly responsive to pressure of the motive fluid as supplied to the power turbine.

In the form of apparatus illustrated Fig. 2c, the pressure of the motive fluid as supplied to the turbines is utilized to effect throttling of the motive fluid supplied to the useful power turbine. In this instance the valve member 42a of the secondary control valve 42 is connected by means of suitable linkage 54 to piston 56 in cylinder 58. A spring 60 acting on piston 56 tends to move the latter so as to close valve 42. A pipe 62 transmits pressure from the inlet conduit 32 to piston 56 in opposition to the force exerted by the spring 60. The strength of spring 60 is related to the area of the piston 56 so that the pressure existing in conduit 32 during full load operation of the system is sufficient to maintain valve 42 in open position against the action of the spring. When, upon decrease in load, the pressure of the motive fluid in conduit 32 drops as a result of the fuel regulation effected through the medium of the main fuel control valve, spring 60 moves the valve 42 toward closed position to effect the desired throttling of the motive fluid passage to the power turbine 10.

Figure 2D:
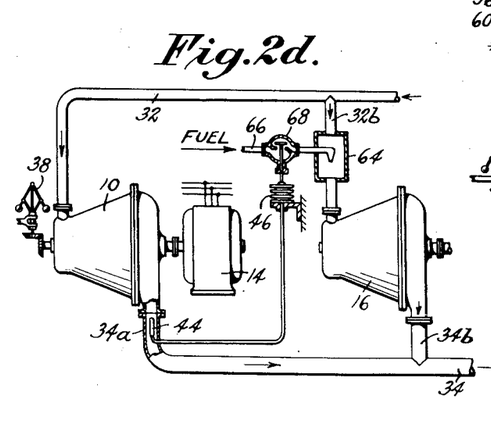
Fig. 2d is another modification of Fig. 2 in which secondary control is effected by a secondary fuel supply.

In Fig. 2d, a secondary governor is shown which operates to effect the desired control of the exhaust temperature and of the energy distribution to the different turbines by supplying additional fuel to the motive fluid going to one of the turbines. In this arrangement, the throttle valve 42 employed in the arrangement shown in the preceding figures is omitted, and in the branch inlet conduit 32b leading to the compressor turbine 16, there is provided a reheater 64, to which fuel is supplied through the fuel supply pipe 66 under the control of an auxiliary fuel supply valve 68. The fuel supply valve 68 is opened by means responsive to a factor reflecting a drop in the load on the system, which in the embodiment shown is in the form of a thermostat 44 and bellows 46 operative upon rise of temperature of the exhaust gases in branch 34a to open valve 68 and cause additional fuel to be supplied to the motive fluid flowing to the compressor turbine 16. In the operation of this modification of the apparatus at full load or partial loads of sufficiently high value to render the resultant rise in exhaust temperature unimportant, the auxiliary fuel valve 68 is closed. When the load on the system drops to a value such that the exhaust temperature rises to a value requiring regulation in addition to that afforded by the main fuel control valve, the auxiliary fuel valve is opened, and additional fuel is supplied to the motive fluid flowing to the compressor turbine. This increase in the energy flowing to the compressor turbine causes the compressor to operate at a higher speed than would be obtained without the additional fuel control, and the higher compressor speed results in the production of motive fluid at higher pressure than would otherwise be the case for a given value of partial load. The increased pressure of the motive fluid provides for a greater pressure drop and consequently a greater heat drop through the turbines, and this in turn results in the prevention of a rise in exhaust temperature to an unduly high value. Where, as in this instance, additional fuel is supplied to the motive fluid flowing to one of the turbines at part load, the total power output of the turbines of the system is controlled in accordance with the value of the load on the system as a whole by further compensating regulation of the primary or main fuel governor. In other words, when auxiliary regulation of the type shown in this figure is employed, the position of the main fuel supply valve for stabilized operation of the system at a given value of low partial load will result in a smaller quantity of fuel being supplied to the primary combustion chamber than would be the case where auxiliary regulation is effected by throttling of the motive fluid going to one of the turbines, as illustrated in the previously described figures. In one case, the control of the distribution of energy input to the different turbines is effected by decreasing the amount of energy available to one turbine, and in the other case, control of the distribution is effected by adding energy to the motive fluid supplied to one of the turbines.

It will be understood, of course, that in an arrangement of the character shown in Fig. 2d, the reheating combustion is effected by combustion with excess air not burned in the primary combustion chamber. In systems of the character under discussion, turbines having full admission are preferably employed, and the inlet temperature of the motive fluid is consequently maintained at a relatively moderate value for gas turbine systems, a suitable inlet temperature being within a range of which the lower limit is approximately 800° C. absolute and the upper limit of which is in the neighborhood of 1000° C. absolute.

In systems where water injection is not employed in forming the motive fluid, the desired moderate temperature is advantageously obtained by the use of a substantial quantity of excess air, and this excess air provides the necessary means for supporting combustion in a reheating chamber.

Figure 2E:
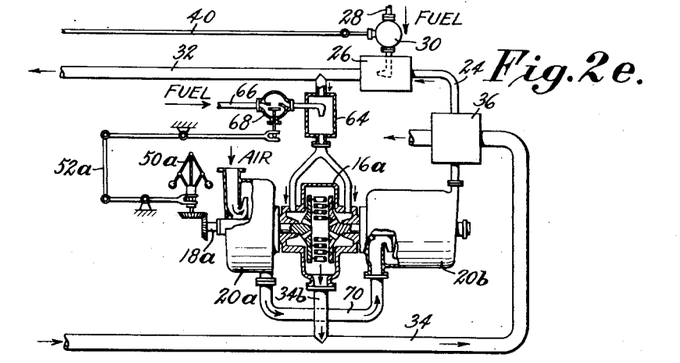
Fig. 2e is another modification of Fig. 2 in which secondary control is by a secondary fuel supply controlled in response to speed of the compressor turbine.

In the arrangement shown in Fig. 2e, the secondary or auxiliary regulation is effected by the addition of fuel to a reheating combustion chamber as in Fig. 2d, but in the arrangement shown in Fig. 2e the control of the auxiliary fuel supply is effected by means of a governor 50a operating in response to variations in speed of the compressor turbine 16a, which in the present embodiment has been shown as a double rotation radial flow turbine operating compressor sections 20a and 20b, connected in series by conduit 70. Governor 50a is operated from shaft 18a of turbine 16a and through the medium of linkage 52a operates to open the auxiliary fuel valve 68 upon decrease in the speed of the compressor turbine to a predetermined value. Obviously, the specific type of turbine employed may be altered. The operation of the apparatus shown in this figure will clearly be similar to that described in conjunction with Fig. 2d, the arrangement shown in the present figure being merely illustrative of the fact that the source and character of the secondary impulse governing the regulation of the auxiliary fuel valve may be altered within the scope of the invention.

Figure 2F:
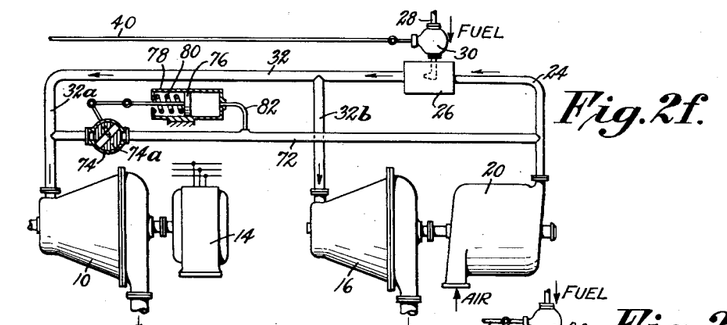
Fig. 2f is another modification of Fig. 2 wherein secondary control is effected by a by-pass arrangement for compressed air.

In the arrangement shown in Fig. 2f, a further means for effecting the auxiliary control is illustrated. In this embodiment, the compressed air conduit 24 is connected to the branch inlet conduit 32a delivering motive fluid to the power turbine 10 by means of a by-pass conduit 72 provided with a control valve 74 for admitting additional air to the branch conduit 32a when the load on the system drops below a predetermined value. In the arrangement shown diagrammatically in the figure, the valve member 74a is connected by means of suitable linkage to a piston 76 operating in cylinder 78. Piston 76 is acted on by spring 80 tending to open the valve and pressure from by-pass conduit 72, which is indicative of the pressure of the compressed air as delivered from the compressor, acts through pipe 82 on piston 76 in opposition to spring 80 to close the valve. The area of piston 76 is related to the strength of spring 80 so that when the pressure in pipe 82 is that corresponding to a load on the system which does not require auxiliary regulation, the valve 74 is closed. Upon decrease in the load on the system to a value resulting in reduction in the pressure of the air delivered from the compressor to a value making auxiliary regulation desirable, spring 80 acts to open valve 74, and to by-pass some of the compressed air from the compressor directly to the inlet conduit leading to the power turbine. This results in a reduction in the temperature of the motive fluid delivered to the power turbine, and also reduces the quantity of air supplied to the combustion chamber 26. Consequently, the temperature of the motive fluid leaving the combustion chamber and supplied to the branch conduit 32b is increased. The reduction in the temperature of the motive fluid delivered to the power turbine from conduit 32a and the increase of the temperature of the fluid delivered through conduit 32b provide variation in the relative amounts of usable energy in the motive fluid supplied to the two turbines, so that for a given total amount of energy supplied to the combustion chamber by the fuel admitted thereto, the compressor turbine gets the greater amount and the compressor is speeded up to effect an increase in the pressure of the motive fluid as compared with the pressure that would be obtained without the auxiliary regulation.

Figure 2G:
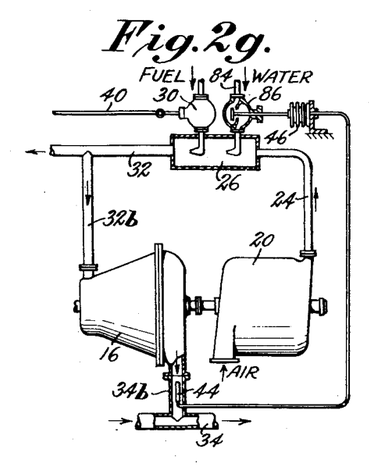
Fig. 2g is a modification of Fig. 2 in which secondary control is effected by injection of water.

In the arrangement shown in Fig. 2g, the exhaust temperature is controlled without changing the relative amounts of energy input to the different turbines by the auxiliary or secondary governing means. This is accomplished by injecting water into the primary combustion chamber to effect a reduction in the temperature of the motive fluid as admitted to the turbines under conditions requiring auxiliary regulation. Water is supplied to the combustion chamber 26 through the supply pipe 84 under the control of valve 86. Valve 86 is controlled by means of thermostat 44 placed in the turbine exhaust branch conduit 34b, and the thermostat bellows 46, the arrangement being such that upon rise in exhaust temperature valve 86 is opened. The resultant injection of water causes the inlet temperature of the motive fluid to be lowered due to the heat required to vaporize the injected water, and consequently the exhaust temperature is also reduced.

Figure 2H:
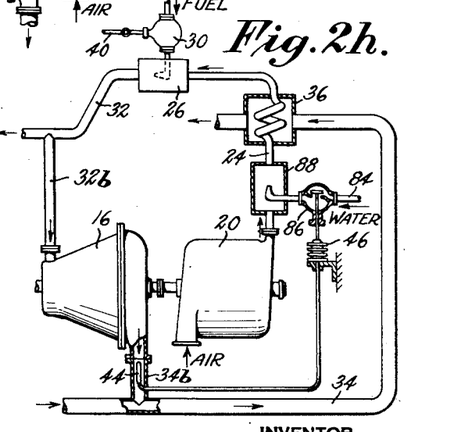
Fig. 2h is another modification of Fig. 2 in which secondary control is also effected by injection of water.

The arrangement shown in Fig. 2h illustrates the same general type of auxiliary regulation as that shown in Fig. 2g, but in the present arrangement the water injection is effected in an injection chamber 88 located in the compressed air conduit 24 between the outlet of the compressor 20 and the regenerator 36. In other respects the construction is like that shown in Fig. 2g, and the injected water serves to reduce the inlet temperature of the motive fluid upon rise of the exhaust temperature in the manner previously described.

From the foregoing description of the several modifications of the auxiliary governor, it will be readily apparent that with a given turbine system the specific character of the impulse in response to which auxiliary regulation takes place may vary widely. As illustrated by the embodiments shown, the impulse may be temperature, pressure or speed responsive in its nature. It will further be evident that the manner in which the regulation effects the desired result may vary widely. It may alter the relative amounts of available energy delivered to the different turbines by changing the amount or the character of the motive fluid admitted to one of the turbines, and it may effect the change in the relative amounts supplied to the turbines by decreasing the supply to one turbine or by increasing the supply to another. Auxiliary regulation may also be effected to control the exhaust temperature by changing the characteristics of the motive fluid supplied to a plurality of the turbines without changing the relative characteristics of the motive fluid as supplied to different turbines.

From a consideration of the various arrangements for auxiliary regulation which have just been described, it will further be evident that numerous other specific combinations may be employed with equal facility without departing from the invention and that different ones of the specific kinds of actuating impulses may be employed with various specific kinds of auxiliary regulation.

While for the sake of simplicity in illustrating various means for carrying the invention into effect, it has been shown in all of the preceding modifications as applied to a simple low pressure system comprising two turbines in parallel, the invention is not limited in its use to systems of this character but is equally applicable to systems of more complex nature adapted to operate at higher pressures and using a larger number of turbines arranged in different manners with respect to flow of motive fluid.

Figure 3:
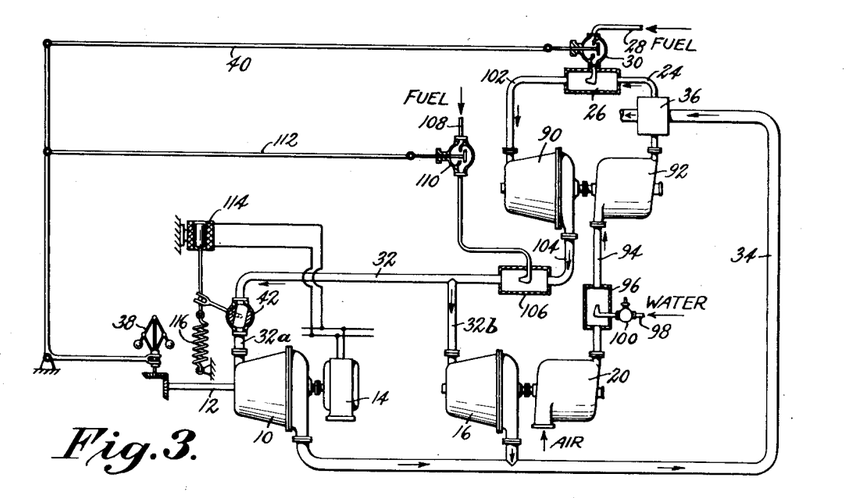
Fig. 3 is a diagrammatic view partly in section of a different arrangement of a gas turbine system embodying a different arrangement of turbines from that shown in Fig. 2.

In Fig. 3 there is illustrated a system having three turbines arranged in series parallel with respect to flow of motive fluid, these turbines consisting of the low pressure power turbine 10 driving the generator 14, a low pressure compressor turbine 16 driving a low pressure compressor 20, and a high pressure turbine 90 driving a high pressure compressor 92. The two compressor sections are connected in series by means of conduit 94, which may advantageously have located therein a water injection chamber 96, to which water is injected through the supply pipe 98 under the control of a suitably regulated valve 100. A regenerator 36 is advantageously located in the high pressure compressed air conduit 24 connecting the compressor discharge with the primary combustion chamber 26, and the exhaust gases from turbines 10 and 16 are conducted to the regenerator through the exhaust conduit 34. Fuel is supplied to the primary combustion chamber through supply pipe 28 under the control of the main fuel control valve 30, which by means of a linkage 40 is connected to the primary or main governor 38 driven from shaft 12 of turbine 10.

From the combustion chamber 26 the motive fluid is conducted through conduit 102 to the inlet of the high pressure turbine 90, which exhausts through conduit 104 to the secondary or reheating combustion chamber 106, to which fuel is supplied from pipe 108 under the control of valve 110, which may advantageously be controlled also from the main governor 38, as by means of the link 112. From the reheating combustion chamber the motive fluid is conducted through the low pressure inlet conduit 32 and branches 32a and 32b to the turbines 10 and 16 respectively. The secondary or auxiliary regulation in this embodiment is effected by means of throttle valve 42 located in the inlet branch 32a, and in order to further illustrate the variety of impulses that may be employed to actuate the secondary regulating means, there has been shown in this instance a regulation effected by an electrical impulse indicative of the load on the system. To this end, a solenoid 114 has been shown connected to the output leads from the generator 14 and arranged so that when the system is operating at full load or relatively high loads, the strength of the current causes the solenoid to hold valve 42 open against the action of spring 116, and when the load falls below a predetermined value the spring causes the valve to throttle the flow of motive fluid to the turbine 10. Obviously any other equivalent electrical impulse means may be used, or any one of the various impulses shown in conjunction with Fig. 2 and its related figures may be used in lieu of the electrical impulse.

By comparing Fig. 2 with Fig. 3 it will immediately be apparent that with respect to the secondary regulation the action of the two systems is the same, since the system shown in Fig. 3 is essentially the same as that shown in Fig. 2, with the addition of a high pressure turbine connected in series ahead of the two low pressure turbines and with the high pressure turbine driving a high pressure compressor connected in series with the compressor driven by one of the low pressure turbines. It will further be evident that the general mode of operation of the system in response to variations in load on the system will be as described in connection with Fig. 2.

Figures 4, 4A:
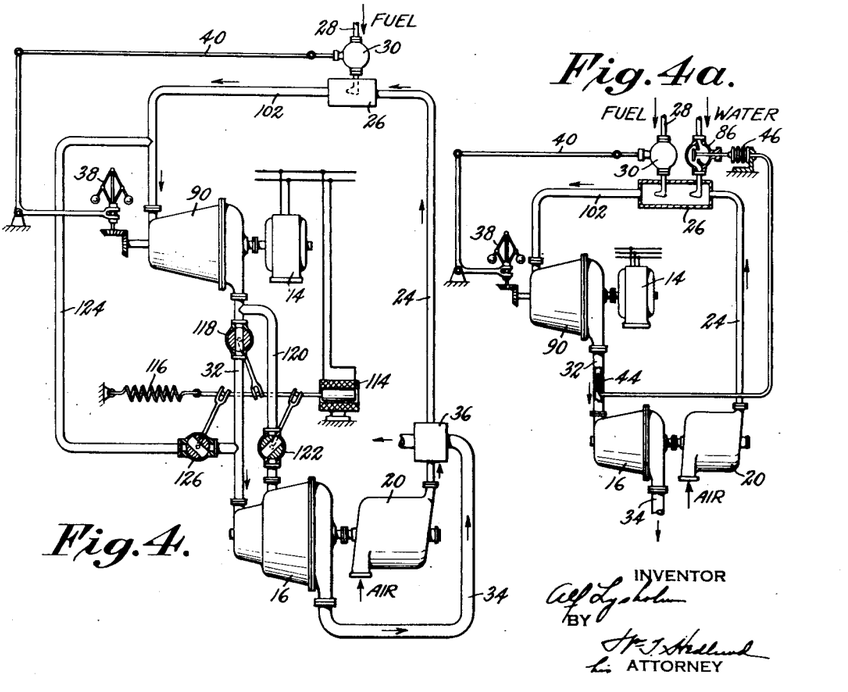
Fig. 4 is a similar view showing still another turbine arrangement.
Fig. 4a is a view showing a different control system for a turbine arrangement of the kind shown in Fig. 4.

In Fig. 4, the invention is shown applied to a system in which only two turbines are employed, but with the turbines connected in series rather than in parallel. In this system, the low pressure air compressor 20 is driven by the low pressure compressor turbine 16, which exhausts through conduit 34 to regenerator 36 located in the compressed air conduit 24 connecting the compressor 20 with the combustion chamber 26.

The generator 14 is driven by the high pressure power output turbine 90, which receives motive fluid from the combustion chamber 26 through the conduit 102, and which exhausts motive fluid to the low pressure inlet conduit 32 leading to the low pressure compressor turbine 16, when the auxiliary or secondary governing means is not in action. A valve 118 is located in the inlet conduit 32 and a branch conduit 120 connects conduit 32 on the inlet side of valve 118 with an intermediate pressure stage of turbine 16. A valve 122 is located in conduit 120. A by-pass conduit 124 connects the high pressure inlet conduit 102 with the low pressure inlet conduit 32 on the outlet side of valve 118, and a valve 126 is located in conduit 124. The low pressure turbine discharges through the exhaust conduit 34, which advantageously is connected to the regenerator 36. The main fuel governing control is similar to that previously described, the main fuel valve 30 being under the control of governor 38 driven from the shaft of the useful power turbine. The electrical form of auxiliary control, similar to that shown in Fig. 3, has been shown by way of illustration, but it will be understood that other kinds of control impulses indicative of load on the system, may be employed. Valves 118 122 and 126 are interconnected as shown in the figure so that as the load on the system drops to a predetermined value, valve 118 moves toward closed position and valves 122 and 126 open.

In the operation of this system at full load or high partial load, the motive fluid formed in the combustion chamber 26 is expanded serially first through the useful power turbine and then through the compressor turbine. As the load drops the heat drop in the low pressure turbine decreases at a more rapid rate than the decrease in the load on the system, and when the load has reached a sufficiently low value a condition arises, as heretofore explained, which causes the exhaust temperature of the low pressure turbine to rise to an undesirable degree, and further results in insufficient power being developed by the low pressure turbine. When this condition arises the closing of valve 118 under the influence of the auxiliary governor and the opening of valves 122 and 126 alters the distribution of the motive fluid. The low pressure turbine, after the shifting of the valves, receives motive fluid at higher pressure than that at which it received it prior to the shifting of the valves because the source of motive fluid admitted to the first stage of the low pressure turbine is now the conduit 102 leading directly from the combustion chamber rather than the exhaust conduit 32 from the high pressure turbine. The opening of the valve 122 permits the motive fluid exhausted from the high pressure turbine, which previously was admitted to the first stage of the low pressure turbine, to be admitted to a subsequent stage of the low pressure turbine. Due to the fact that the first stage of the low pressure turbine is now operating at higher initial pressure, the intermediate stage of the low pressure turbine to which the exhaust from the high pressure turbine is now admitted may operate at approximately the same pressure at that which existed in the first stage of the low pressure turbine just prior to the shifting of the valves. Obviously, by increasing the pressure at which motive fluid is admitted to the low pressure turbine, a higher heat drop will occur in this turbine and more power will be developed by it. Also, due to the by-passing of a part of the high pressure fluid around the high pressure turbine, the amount of fluid flowing through this turbine will be decreased.

In considering the action of this particular control, it may be said that the auxiliary or secondary governing means tends to shift the connection of the turbines from a condition where straight series flow occurs to a condition where the turbines are connected partly in series and partly in parallel.

In Fig. 4a, two turbines connected in series are shown, the general arrangement being similar to that described in conjunction with Fig. 4. In this embodiment, however, the auxiliary or secondary regulation is not effected by altering the distribution of the motive fluid with respect to the two turbines, but by altering the character of the fluid. The general cycle of operation of this system, with the main fuel control regulation, will be obvious from the description of the preceding figures. As the load on the system drops from the normal full load value, the pressure of the motive fluid admitted to the high pressure turbine 90 decreases, and the pressure and temperature of the motive fluid exhausted from this turbine to the low pressure inlet conduit 32 are also decreased, since with the turbines connected in series the back pressure against which the high pressure turbine exhausts will decrease with decrease in load. On the other hand, the exhaust temperature of the low pressure turbine will increase with decrease in load, for reasons which have already been explained. In order to prevent undue rise of the exhaust temperature of the low pressure turbine, the initial temperature of the motive fluid is decreased by means of water injection controlled by the secondary or auxiliary governor. In the embodiment shown, this is effected by means of thermostat 44 located in the low pressure inlet conduit 32, and operating bellows 46, which in turn opens the water injection valve 86. Thus, when a load value is reached which requires secondary regulation, the character of the motive fluid is altered by decreasing its temperature as delivered to the high pressure turbine while increasing the volume of motive fluid produced by a given amount of fuel. The increase in the volume produced by a given amount of fuel is due to the steam generated by the injection of water. With lower initial temperatures, the exhaust temperature will obviously be reduced.

Figures 5, 5A:
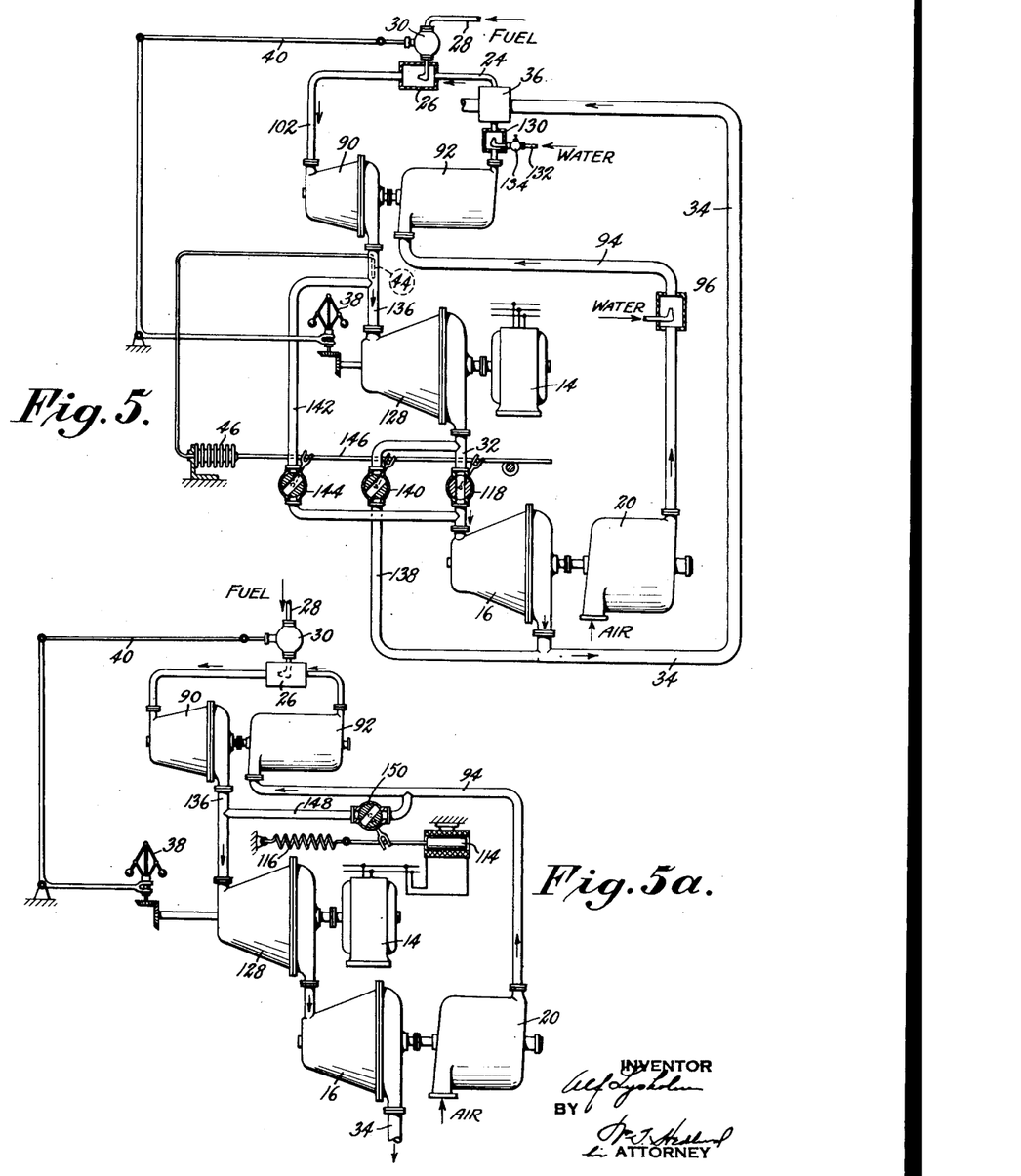
Fig. 5 is a view similar to Fig. 2 showing a system embodying still another turbine arrangement.
Fig. 5a is a view illustrating another kind of control for the same turbine arrangement shown in Fig. 5.

Fig. 5 illustrates one way of applying the invention to a high pressure system comprising three turbines arranged in series consisting of a useful power turbine and two compressor turbines. In this system, the low pressure air compressor 20 is driven by a low pressure turbine 16, exhausting to conduit 34, which advantageously leads to the regenerator 36. The generator 14 is driven by an intermediate pressure turbine 128, from which the main governing control is taken by means of governor 38 operating the main fuel valve 30. The high pressure turbine 90 drives a high pressure compressor 92, the inlet of which is connected to the low pressure compressor 94, in which there may advantageously be located a water injection chamber 96 similar to that shown in Fig. 3. Additional water may advantageously be injected after final compression in the water injection chamber 130, supplied with water from a pipe 132 under the control of a suitably regulated valve 134. Motive fluid exhausted from the high pressure turbine is conducted to the intermediate pressure turbine through conduit 136, and the intermediate pressure turbine exhausts motive fluid under normal full load operating conditions to the low pressure turbine through the conduit 32.

The auxiliary or secondary governing arrangement comprises a valve 118 located in conduit 32, a by-pass conduit 138 connecting conduit 32 on the inlet side of valve 118 with the exhaust conduit 34, a valve 140 in conduit 38, a by-pass conduit 142 connecting the intermediate pressure conduit 136 with the low pressure inlet conduit 32 on the outlet side of valve 118, a valve 144 in conduit 142, a thermostat 44 located in the conduit 136, a bellows 46 actuated by thermostat 44, and suitable linkage indicated generally at 146 whereby thermostat element 44 controls said valves.

As in the previously described embodiments, a decrease in load on the system results in an increase in the exhaust temperature of the low pressure turbine and a disproportionately large decrease in the available heat drop for this turbine. Consequently, in order to compensate for this condition, valves 118, 140 and 144 are connected to the thermostat actuating means so that as the temperature of the exhaust from the high pressure turbine 90 falls with decrease in load on the system, valve 118 is moved toward its closed position, and valves 140 and 144 are opened so as to admit motive fluid at intermediate pressure to the inlet of the low pressure turbine 16 and permit motive fluid to be exhausted from the intermediate pressure turbine to the exhaust conduit 34. It will be evident that the secondary control in this instance is very similar to the secondary control employed in the system shown in Fig. 4, substantially the only differences being that in the present instance the intermediate pressure turbine exhausts to final exhaust pressure rather than to an intermediate stage of turbine 16 when the secondary regulation takes place, and that the temperature responsive impulse of the type shown in Fig. 4a, is employed, rather than the electrical impulse shown in Fig. 4.

The system illustrated in Fig. 5 is further indicative of the wide variety of specific arrangements that may be employed to effect the purpose of the present invention.

In the system shown in Fig. 5a, the turbine and compressor arrangement is similar to that shown in Fig. 5, there being three turbines arranged in series with the intermediate pressure turbine, constituting the useful power turbine, driving the generator, and the high and low pressure turbines respectively operating the high and low pressure compressors in this system. Primary regulation of the total output is effected in the manner hereinbefore described by means of the main governor 38, operated from the intermediate pressure turbine and controlling the main fuel valve 30. The secondary regulation is effected by by-passing compressed air of intermediate pressure from the conduit 94 to the conduit 136 conducting the exhaust from turbine 90 to the inlet of the intermediate pressure turbine 128. The by-passing is effected by means of conduit 148, in which is located the control valve 150. In this embodiment the electrical load responsive means comprising the solenoid 114 is employed. Other kinds of control impulses may obviously be used. As shown in the figure, the solenoid means is so arranged that upon decrease in load on the system to a predetermined value, valve 150 is opened to by-pass air at intermediate pressure to the partially expanded motive fluid which is to be further expanded in turbines 128 and 16, thus increasing the volume and decreasing the temperature of the motive fluid supplied to these turbines. The system shown in this figure is similar in many respects to the system shown in Fig. 2f, wherein, in a low pressure system compressed air is by-passed in order to alter the character of the motive fluid supplied to different turbines in the system.

In the system illustrated in Fig. 5a, it will be understood that the design of the low pressure compressor 20 must be made such that it delivers air at part load at a pressure at least as high as the exhaust pressure from the high pressure turbine 90 at such partial load. It will further be evident that the by-passed air does not necessarily have to be taken from this particular pressure stage.

Figures 6, 7, 8, 9:
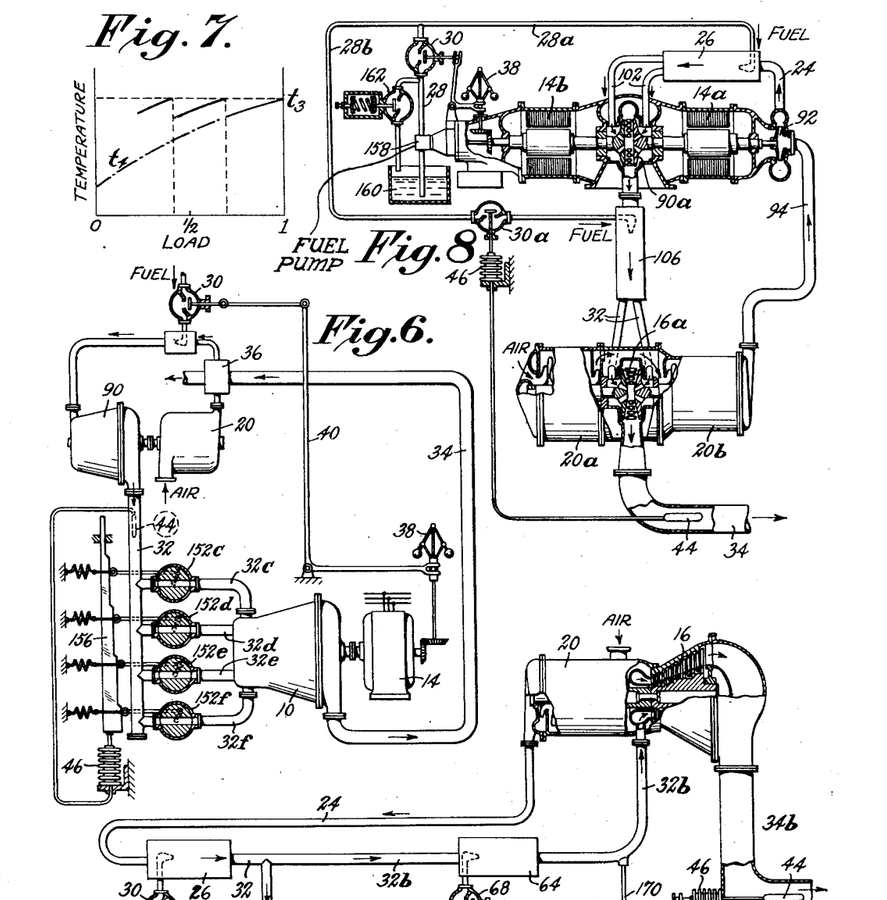
Fig. 6 is a view similar to Fig. 2 showing still another turbine arrangement.
Fig. 7 is a diagram illustrating certain temperature load characteristics.
Fig. 8 is a view similar to Fig. 4 showing another type of control system with a turbine arrangement such as shown in Fig. 4.
Fig. 9 is a view similar to Fig. 2 illustrating a compound control means applied to a system having the same general turbine arrangement as that shown in Fig. 2.

In Fig. 6 is shown an application of the invention to a system comprising turbines in series, in which a low pressure useful power turbine 10 drives the generator 14, and in which the air compressor 20 is driven by a high pressure turbine 90. As in the embodiment previously described, the main fuel control valve 30 is governed by the main governor 38 driven from the useful power turbine. The low pressure inlet conduit 32 is in this instance connected to the turbine 10 by means of a number of branches 32c, 32d, 32e and 32f, controlled respectively by valves 152c, 152d, 152e and 152f. These branches provide for partial admission of motive fluid to the turbine 10 and the number thereof may be varied, four having been shown merely by way of illustration.

A thermostat 44, operating the bellows 46, actuates the several valves so as to close them in sequence. In order to illustrate the arrangement a cam bar 156 has been shown movable under the influence of the bellows 46, and as clearly appears from the drawings, contraction of the bellows in response to decrease in temperature of the thermostat element 44 will cause the valves to close progressively under the influence of the respective valve springs. When the system is operating at normal full load, all of the admission valves are maintained open by the thermostat controlled means, which under this condition is subject to a temperature indicated at $t_3$ in the diagram of Fig. 7. As the load on the system decreases the exhaust temperature from the turbine 90 decreases about as indicated by the curve $t_3$—$t_4$ and a condition is eventually arrived at at which the heat drop available for the low pressure turbine is insufficient. The decreasing temperature to which the thermostat element is subjected causes the latter to actuate the regulating means so that one or more of the partial admission valves are closed. Closure of one or more of these valves restricts the conduit through which fluid can be exhausted from the high pressure turbine, and results in building up a higher back pressure against this turbine than would otherwise be the case. The increase of the back pressure on the high pressure turbine decreases the pressure range through which the motive fluid can expand in this turbine. Consequently, the heat drop through the turbine is decreased and the exhaust temperature increases. At the same time, the amount of pressure drop and heat drop through the low pressure turbine is increased due to the increase of the admission pressure to this turbine. The increase in the back pressure of the high pressure turbine, resulting in smaller heat drop through this turbine, decreases the volume and pressure of the compressed air and effects a consequent rise in temperature of the motive fluid for a given amount of fuel admission. These factors cooperate to produce a stabilized condition of operation at low partial load wherein the exhaust from the high pressure turbine is throttled to an extent such that the low pressure turbine receives motive fluid at a pressure and temperature providing sufficient heat drop through this turbine to carry the partial load with the amount of motive fluid produced by the operation of the compressor at such load.

The secondary regulation may also be effected by modifying the effect of the regulation produced by the main regulating means. In order to illustrate this particular kind of regulation, a system is shown in Fig. 8, in which two turbines are arranged in series with the compressor turbine 16a of the double rotation type operating compressor sections 20a and 20b. The useful power turbine 90a, illustrated in this embodiment, is also of the double rotation radial flow type driving generator parts 14a and 14b, from which the useful power is taken. The compressor section 20b delivers intermediate pressure air through conduit 94 to a high pressure compressor 92, which in this instance is driven from one of the shafts of turbine 90a, and the finally compressed air is delivered through the high pressure conduit 24 to the combustion chamber 26, from which it flows through conduits 102 to turbine 90a. Motive fluid exhausted from turbine 90a passes to a reheating combustion chamber 106 and from the latter through the inlet conduits 32 to the low pressure turbine 16a.

As in previously described embodiments, the main governor 38 is driven from the useful power turbine and controls the main fuel valve to which fuel is supplied through fuel pipe 28 under pressure from the pump 158 operated from one of the useful power turbine shafts and receiving fuel from the reservoir 160. A spring loaded by-pass valve 162 is advantageously employed to maintain a constant pressure on the inlet side of the valve 30. On the discharge side of valve 30 the fuel supply line is provided with two branches 28a and 28b, the former supplying fuel to the primary combustion chamber 26 and the latter supplying fuel to the reheating combustion chamber 106. In the fuel supply line 28b a secondary fuel control valve 30a is located, which valve is under the control of the thermostat 44 located in the exhaust conduit 34, and the thermostat actuated bellows 46. In this system, when operating at full load and high partial loads, the main governor effects flow of fuel to the primary and reheating combustion chambers, valve 30a being opened to a suitably adjusted amount so as to effect the proper distribution of fuel to the two chambers. Ordinarily, under full load operating conditions, the partially expanded motive fluid from the turbine 90a is reheated by the addition of sufficient fuel to bring the inlet temperature of the motive fluid as admitted to the low pressure turbine to a value approximating the initial temperature of the motive fluid. As previously explained, a decrease in the load on the system to a relatively low value causes such disproportionate decrease in the amount of heat available for the low pressure turbine that an increase in the energy available to this turbine is desirable, and in the embodiment shown, when the load decreases to such a value as to require secondary regulation, the rise in exhaust temperature from the low pressure turbine actuates valve 30a to admit more fuel to the reheating combustion chamber, and distribution of fuel is thus altered as between the two combustion chambers so that relatively more energy is delivered to the compressor turbine. This in turn causes the compressor work to increase and stabilized operation is secured at low part loads with the low pressure turbine being supplied with motive fluid providing for a greater available heat drop in the low pressure turbine than would be the case without the secondary regulation.

It will be evident to those skilled in the art that the various kinds of actuating impulses described in connection with the preceding embodiments may be employed for operating the auxiliary fuel valve to effect the desired alteration in the distribution of fuel. Compound control may be employed so that the control is responsive to more than one character of impulse. To illustrate this, Fig. 9 shows a simple low pressure system of the type shown in Fig. 2, wherein the low pressure useful power turbine 10 drives the generator 14, and the low pressure compressor turbine 16 operates compressor 20, the two turbines being connected in parallel by means of the inlet conduit branches 32a and 32b. Air from the compressor 20 is conducted to the primary combustion chamber 26 through conduit 24, and fuel is supplied under control of the main fuel valve 30, which is regulated by governor 38 on the shaft of the useful power turbine 10. The main regulation is similar to that previously described in conjunction with Fig. 2. In the present embodiment, secondary regulation is effected by control of fuel supplied through valve 68 to a secondary combustion chamber 64, located in the branch conduit 32b. The arrangement thus far described is similar to that shown in Fig. 2d, but in the present instance secondary control is made responsive to both temperature and pressure. To this end, thermostat 44 is located in the exhaust conduit 34b of the compressor turbine, and thermostat bellows 46 is connected by means of linkage indicated at 162 to the valve actuating rod 68a. Further, a pressure cylinder 164 is provided having therein a piston 166 acted on by a spring 168. The end of the cylinder opposite that containing the spring is connected by means of pipe 170 with the inlet conduit 32b leading to the compressor turbine, and the opposite end of the cylinder is connected to the exhaust conduit by means of pipe 172. Piston 166 is connected to the valve actuating rod 68a by means of a link 174 to which the link 162 is also connected, the arrangement being such that upon movement of piston 166 under the influence of increased pressure in branch conduit 32b, and with a constant exhaust temperature, the fuel valve 68 will be regulated to decrease the fuel supply to chamber 64.

In the operation of this system, assuming the load to have dropped to a degree requiring secondary regulation, a rise in exhaust temperature, for a given pressure in the conduit branch 32b, will cause fuel valve 68 to supply additional fuel to the compressor turbine and increase the energy available to this turbine so as to increase the rate of air compression and the air pressure. The pressure responsive piston 166 acts as a compensating control of the motive fluid being supplied to the compressor turbine. By means of a compound control of the character illustrated, it is possible to reduce to a minimum any tendency of the secondary governing system to "hunt", and to rapidly obtain a stabilized condition of partial load operation.

The numerous different embodiments of apparatus hereinbefore described will make it evident to those skilled in the art that the principles of the invention are applicable to a very wide variety of plant arrangements comprising gas turbine systems of the character under discussion, and that the control of systems comprising different turbine arrangements may be effected in a wide variety of ways through the employment of widely differing specific kinds of control apparatus responsive to different characters of impulses indicative of load on the system. It is accordingly to be understood that the invention is not restricted in its scope to systems of the specific kinds hereinbefore described as illustrative embodiments, but is to be understood as including all such variations in apparatus and in mode of operation as may fall within the scope of the appended claims when they are construed as broadly as is consistent with the state of the prior art.

What I claim is:

1. A gas turbine system of the continuous combustion type including a useful power turbine, a compressor turbine independent of the useful power turbine with respect to speed of operation, said turbines being arranged so that at least one of them exhausts against substantially constant back pressure, a compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply and secondary governing means for limiting the temperature of the motive fluid exhausted from the constant back pressure turbine.

2. A gas turbine system of the continuous combustion type including a useful power turbine, a compressor turbine independent of the useful power turbine with respect to speed of operation, said turbines being arranged so that at least one of them exhausts against substantially constant back pressure, a compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply and secondary governing means operable independently of the main governing means and responsive to a governing impulse indicative of substantially reduced load on the system for limiting the temperature of the motive fluid exhausted to said substantially constant back pressure.

3. A gas turbine system of the continuous combustion type including a useful power turbine, a compressor turbine independent of the useful power turbine with respect to speed of operation, said turbines being arranged so that at least one of them exhausts against substantially constant back pressure, a compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply and secondary governing means operable independently of the main governing means for altering the amounts of power developed by said turbines relative to each other upon substantial decrease in the external load on the system.

4. A gas turbine system of the continuous combustion type including a useful power turbine, a compressor turbine independent of the useful power turbine with respect to speed of operation, said turbines being arranged so that at least one of them exhausts against substantially constant back pressure, a compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply and secondary governing means operable upon substantial decrease in the external load on the system to increase the amount of usable energy supplied to the turbine exhausting against said substantially constant back pressure.

5. A gas turbine system of the continuous combustion type including a useful power turbine, a low pressure compressor turbine independent of the useful power turbine with respect to speed of operation, a compressor driven by said compressor turbine for compressing air to be utilized as a constituent of motive fluid for driving said turbines, a main fuel supply for supplying fuel to be burned with said air to form motive fluid, a secondary fuel supply for increasing the temperature of the motive fluid supplied to said compressor turbine, main governing means for controlling said main fuel supply in response to variations in the external load on said system and secondary governing means responsive to variations in the temperature of the exhaust from said compressor turbine for controlling said secondary fuel supply.

6. A gas turbine system of the continuous combustion type including a useful power turbine, a low pressure compressor turbine independent of the useful power turbine with respect to speed of operation, a compressor driven by said compressor turbine for compressing air to be utilized as a constituent of motive fluid for driving said turbine, a main fuel supply for supplying fuel to be burned with said air to form motive fluid, a secondary fuel supply for increasing the temperature of the motive fluid supplied to said compressor turbine, main governing means for controlling said main fuel supply in response to variations in the external load on said system and secondary governing means responsive to variations in the temperature of the exhaust gas from said compressor turbine and responsive to variations in the pressure of motive fluid supplied to said compressor turbine for controlling said secondary fuel supply.

7. A gas turbine system of the continuous combustion type including a useful power turbine, a compressor turbine independent of the useful power turbine with respect to speed of operation, said turbines being connected in parallel and exhausting against substantially constant back pressure, a compressor driven by said compressor turbine for compressing air to be utilized as a constituent of motive fluid for driving said turbines, a main fuel supply for supplying fuel to be burned with said air to form said motive fluid, main governing means for controlling the main fuel supply in accordance with variations in the external load on the system and secondary governing means responsive to a regulating impulse indicative of substantially reduced external load on the system for increasing the amount of energy in the motive fluid available for expansion in the compressor turbine relative to the amount of energy available for expansion in the useful power turbine.

8. A gas turbine system of the continuous combustion type including a useful power turbine, a compressor turbine independent of the useful power turbine with respect to speed of operation, said turbines being connected in parallel and exhausting against substantially constant back pressure, a compressor driven by said compressor turbine for compressing air to be utilized as a constituent of motive fluid for driving said turbines, a main fuel supply for supplying fuel to be burned with said air to form said motive fluid, a secondary fuel supply for supplying additional fuel to the motive fluid for said compressor turbine, main governing means for regulating said main fuel supply in accordance with variations in the external load on the system and secondary governing means responsive to increase in the temperature of exhaust gas from the compressor turbine to increase the secondary fuel supply.

9. A gas turbine system of the continuous combustion type including a useful power turbine, a compressor turbine independent of the useful power turbine with respect to speed of operation, said turbines being arranged in series with the compressor turbine operated by motive fluid exhausted from the useful power turbine and exhausting against substantially constant back pressure, a compressor driven by said compressor turbine for compressing air to be utilized as a constituent of said motive fluid, a main fuel supply for supplying fuel to be burned with said air to form said motive fluid, a secondary fuel supply for supplying fuel to reheat the motive fluid exhausted from said useful power turbine before it is admitted to said compressor turbine, main governing means for controlling said main fuel supply in accordance with variations in the external load on the system and secondary governing means responsive upon increase in the temperature of the gas exhausted from said compressor turbine to increase said secondary fuel supply.

10. A gas turbine system of the continuous combustion type including a useful power turbine, a compressor turbine independent of the useful power turbine with respect to speed of operation, said turbines being connected in parallel and exhausting against substantially constant back pressure, a compressor driven by the compressor turbine for compressing air to be utilized as a constituent of motive fluid for driving said turbines, a main fuel supply for supplying fuel to be burned with said air to form said motive fluid, main governing means for controlling said main fuel supply in accordance with variations in external load on the system, means for throttling flow of motive fluid to said useful power turbine and secondary governing means responsive to increase in the temperature of the exhaust gas from the system for actuating said throttling means.

11. In the operation of a gas turbine system of the continuous combustion type having a useful power turbine, a compressor turbine independent of the useful power turbine with respect to speed of operation and exhausting against substantially constant back pressure and driving a compressor for compressing air to be used as a constituent of motive fluid for driving said turbines, a main fuel supply for producing motive fluid from said air and a secondary fuel supply for supplying additional fuel to motive fluid flowing only to said compressor turbine, that improvement which consists in decreasing the amount of fuel supplied by said main fuel supply as the load on the system decreases from normal full load and independently increasing the amount of fuel supplied by said secondary fuel supply when the load on the system decreases from normal full load to a predetermined value of part load.

12. A gas turbine system of the continuous combustion type including a useful power turbine, a compressor turbine independent of the useful power turbine with respect to speed of operation, said turbines being connected in parallel and exhausting against substantially constant back pressure, a compressor driven by the compressor turbine for compressing air to be utilized as a constituent of motive fluid for driving said turbines, a main fuel supply for supplying fuel to be burned with said air to form said motive fluid, main governing means for controlling said main fuel supply in accordance with variations and external load on the system, means for throttling flow of motive fluid to said useful power turbine and secondary governing means responsive to a regulating impulse indicative of substantially reduced external load on the system for actuating said throttling means.

13. A gas turbine system of the continuous combustion type including a useful power turbine, a compressor turbine independent of the useful power turbine with respect to speed of operation and arranged to exhaust against substantially constant back pressure, a low pressure compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply and secondary governing means operable independently of the main governing means upon substantial decrease in the external load on the system for increasing the pressure drop of the motive fluid through said compressor turbine relative to the pressure drop through said useful power turbine as compared with the relative pressure drops through the turbines at normal full load on the system.

14. A gas turbine system of the continuous combustion type including a useful power turbine, a compressor turbine independent of the useful power turbine with respect to speed of operation and arranged to exhaust against substantially constant back pressure, a low pressure compressor driven by said compressor turbine for compressing air to be used as a constituent of motive fluid for driving said turbines, a main fuel supply for supplying fuel to be burned with said air to form said motive fluid, main governing means operative upon change in external load on the system to vary said main fuel supply, a secondary fuel supply for supplying fuel to be burned with air supplied to said compressor turbine and secondary governing means operable independently of the main governing means upon substantial decrease in the external load on the system to increase the amount of fuel supplied by said secondary fuel supply relative to the amount of fuel supplied by said main fuel supply as compared with the relative amounts furnished by said main and secondary supplies when the system is operating at normal full load.

ALF LYSHOLM.